United States Patent

Minicozzi

[11] Patent Number: 5,915,888
[45] Date of Patent: Jun. 29, 1999

[54] ROTARY CUTTING TOOL ASSEMBLY

[76] Inventor: Alfonso Minicozzi, 7701 Montpensier, Anjou, Que., Canada, H1K1L1

[21] Appl. No.: 08/941,983

[22] Filed: Oct. 1, 1997

[51] Int. Cl.$^6$ ........................................ B23C 5/20
[52] U.S. Cl. .............................. 407/54; 407/62; 407/65; 407/113; 407/114
[58] Field of Search ................... 407/54, 53, 50, 407/42, 33, 30, 34, 62, 63, 114, 113

[56] References Cited

U.S. PATENT DOCUMENTS

| | | | |
|---|---|---|---|
| 3,409,965 | 11/1968 | Fisher | 407/63 X |
| 4,251,172 | 2/1981 | Durand | 407/42 X |
| 4,423,989 | 1/1984 | Kress et al. | 407/42 X |
| 5,064,316 | 11/1991 | Stojanovski | 407/113 X |
| 5,193,943 | 3/1993 | Kim | 407/54 X |
| 5,632,576 | 5/1997 | Storch | 407/42 X |
| 5,685,671 | 11/1997 | Packer et al. | 407/54 |

FOREIGN PATENT DOCUMENTS 0065149  11/1982  European Pat. Off. ............. 407/54

*Primary Examiner*—Andrea L. Pitts
*Assistant Examiner*—Henry W. H. Tsai
*Attorney, Agent, or Firm*—Mila Shvartsman

[57] ABSTRACT

The present invention relates to a rotary cutting tool assembly comprising a combination of a single ball nose cutting insert of a generally elongated configuration. The ball nose cutting insert is fixed into a holding body provided with a slot adapted to securely and non-movably hold the insert. The single ball nose cutting insert has at least one fill ball nose cutting end having a cutting edge of a continuous spiral fluted configuration. The fill ball nose cutting end comprises a cutting face consisting of two radius cutting edges meeting at a center or tip of the full ball nose cutting end forming a web. The cutting face forms a true helical path made of a continuous curve following a spiral shape, and helix angles of the radius cutting edges are between 3 to 45 degrees with respect to a longitudinal axis of the ball nose cutting insert in both right and left directions. The ball nose cutting insert has a solid configuration and comprises two identical reversible fill ball nose cutting ends formed on opposite ends of the insert. The radius cutting edges of the cutting faces are arranged to form a spiral or helical configuration, and the cutting faces of the single ball nose cutting insert are formed a grinding wheel.

16 Claims, 4 Drawing Sheets

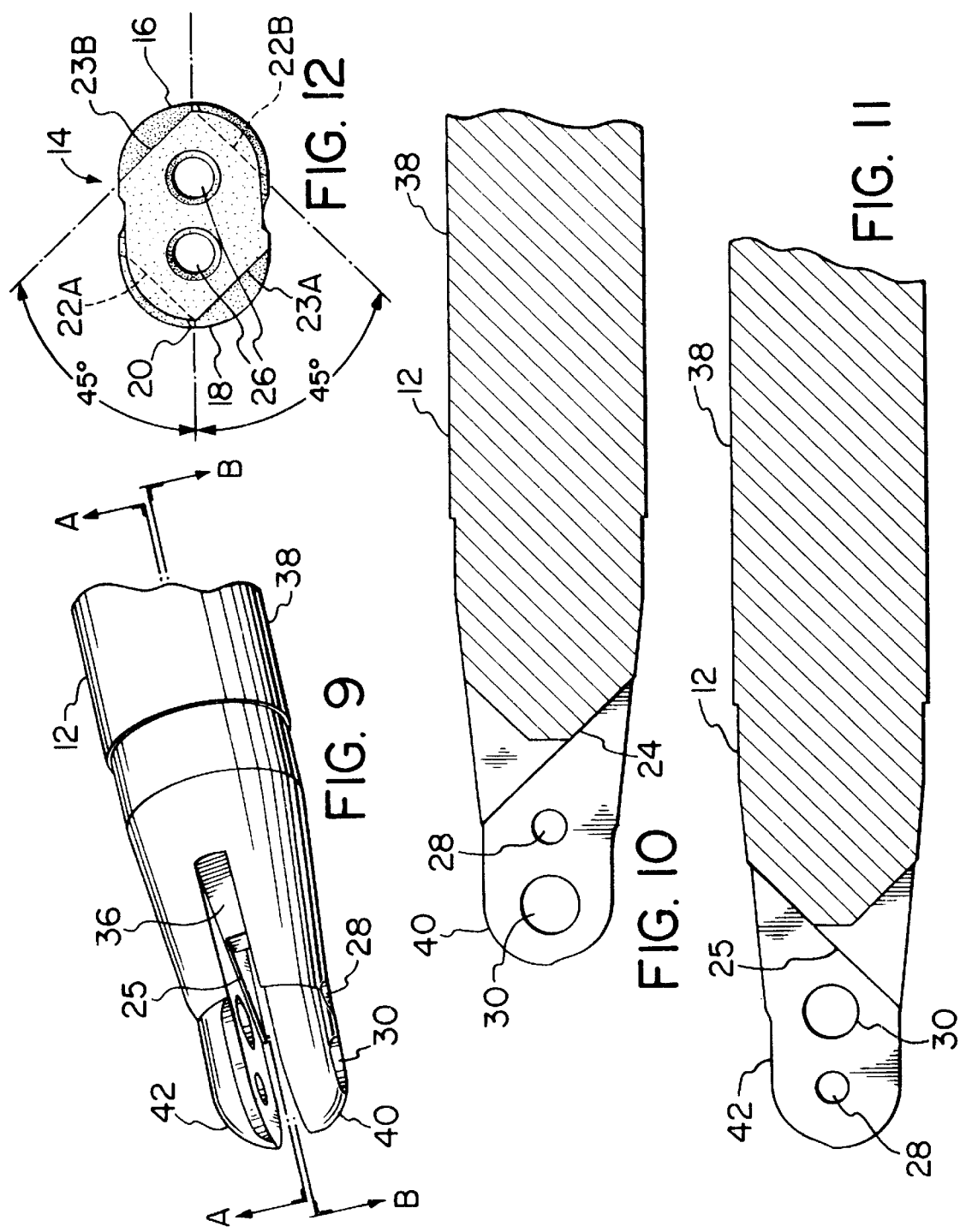

ROTARY CUTTING TOOL ASSEMBLY

The present invention is related to a cutting tool and more particularly to a rotary cutting tool assembly.

Ball nose end mills with carbide ball inserts have been known for a long time. These tools are the backbone of the moulding industries, and are used for machining intricate shapes and cavities.

There are known a few designs of the inserted ball nose end mills. Most of the existing designs have one or two of the following features:

- two separate radius inserts with one insert slightly past the center to achieve a ball end plunge;
- single ball insert with ball on one end only with straight or "0" helix ball cutting edge.

However, in order to improve the rigidity and cutting performance, the necessity has existed to come up with a solid single insert with helical cutting edges. The present invention has solved this problem with tests confirming the effectiveness of such a new design. The present invention has two ball nose cutting ends in one solid piece so that the end-user benefits with cost savings and decreased machine downtime.

SUMMARY OF THE INVENTION

Broadly, the present invention relates to a rotary cutting tool assembly comprising a combination of:

a single ball nose cutting insert of generally elongated configuration, said ball nose cutting insert being fixed into a holding body provided with a slot adapted to securely and non-movably of hold said insert;

wherein said single ball nose cutting insert having at least one full ball nose cutting end having a cutting edge of continuous spiral fluted configuration. Said full ball nose cutting end comprises a cutting face consisting of two radius cutting edges meeting at a center or tip of said fill ball nose cutting end by means of a web.

In another embodiment of the present invention, said cutting face forms a true helical path made of a continuous curve following a spiral shape, and helix angles of said radius cutting edges are between 3 to 45 degrees with respect to a longitudinal axis of said ball nose cutting insert in both right and left directions. Said ball nose cutting insert has a solid configuration, and has two identical reversible fill ball nose cutting ends formed on opposite ends of said insert.

In still another embodiment of the present invention, said radius cutting edges of said cutting faces are arranged to form a spiral or helical configuration, and cutting faces of said single ball nose cutting insert are formed by means of a grinding wheel. Said ball nose cutting insert has locating grooves formed near each end of said insert, and said locating grooves are provided to firmly seat in a corresponding seating faces formed within the slot of said holding body.

In yet another embodiment, said invention comprises a ball nose cutting insert comprising an elongated body of unitary configuration, said ball nose cutting insert having at least one full ball nose cutting end, wherein said full ball nose cutting end having a cutting edge of continuous spiral fluted configuration. Said ball nose cutting insert is adapted to be fixed into a holding body of a rotary cutting tool wherein said holding body is provided with a slot adapted to securely and non-movably hold said insert.

In still another embodiment, said full ball nose cutting end comprising a cutting face consisting of two radius cutting edges meeting at a center or tip of said full ball nose cutting end by means of a web, and said cutting face forms a true helical path made of a continuous curve following a spiral shape. Helix angles of said radius cutting edges are between 3 to 45 degrees with respect to a longitudinal axis of said ball nose cutting insert in both right and left directions, and said ball nose cutting insert having a solid configuration. Said single ball nose cutting insert has two identical reversible full ball nose cutting ends formed on opposite ends of said insert, and said radius cutting edges of said cutting faces are arranged to form a spiral or helical configuration.

In yet another embodiment of the present invention, cutting faces of said single ball nose cutting insert are formed by means of a grinding wheel, and said ball nose cutting insert has locating grooves formed near each end of said insert, said locating grooves are provided to firmly seat in a corresponding seating faces formed within the slot of said holding body.

BRIEF DESCRIPTION OF DRAWINGS

FIG. 9 shows a partial perspective view of FIG. 6.

FIG. 10 shows a cross-sectional view taken along lines A—A of FIG. 9.

FIG. 11 shows a cross-sectional view taken along lines B—B of FIG. 9.

FIG. 12 shows a plan view of the insert according to the present invention.

DETAILED DESCRIPTION OF THE PRESENT INVENTION

Figure 1:
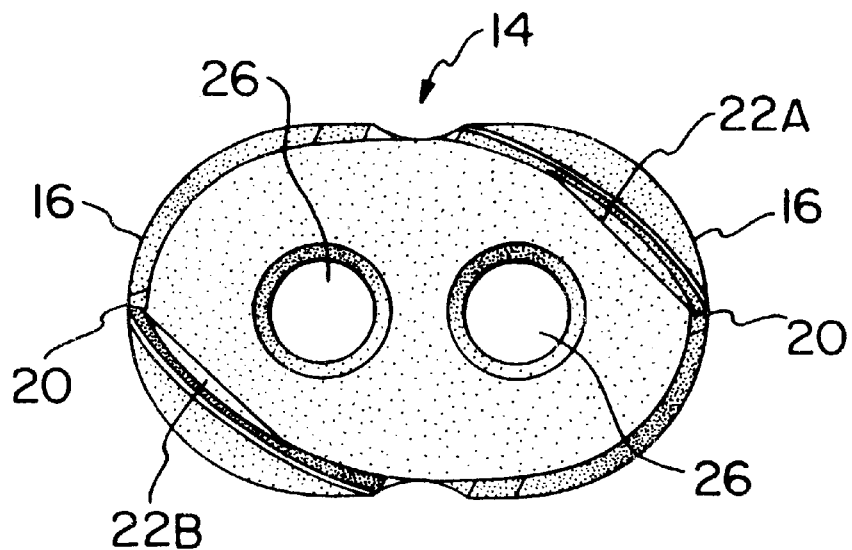
FIG. 1 shows a plan view of an insert according to the present invention.
Figure 2:
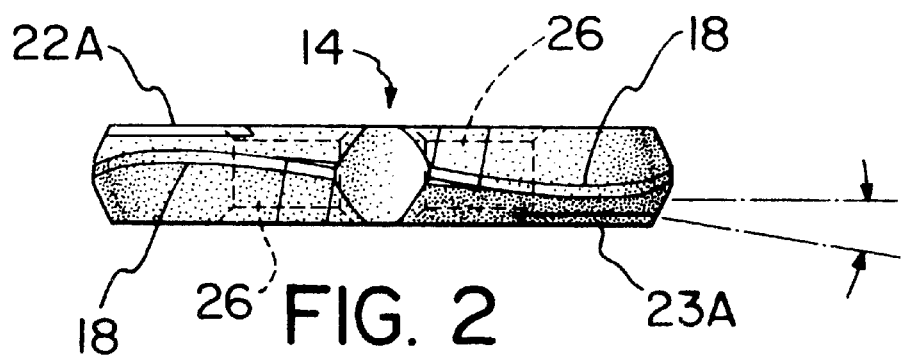
FIG. 2 shows a top view of FIG. 1.
Figure 3:
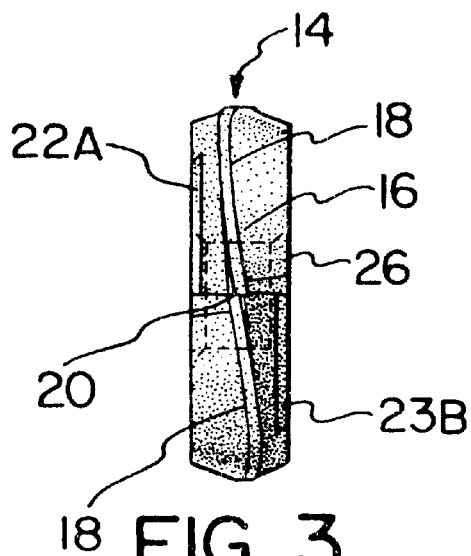
FIG. 3 shows a front view of FIG. 1.
Figure 4:
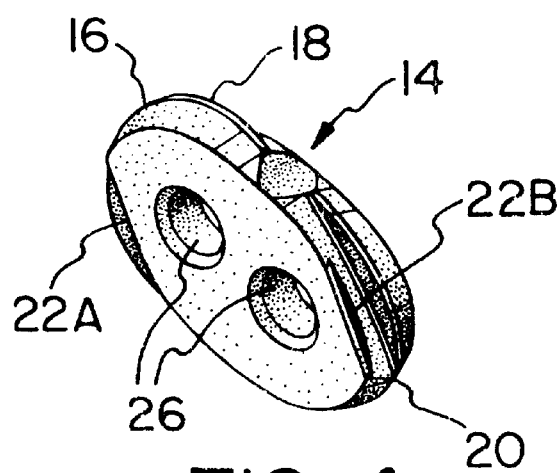
FIG. 4 shows a perspective view of FIG. 1.
Figure 5:
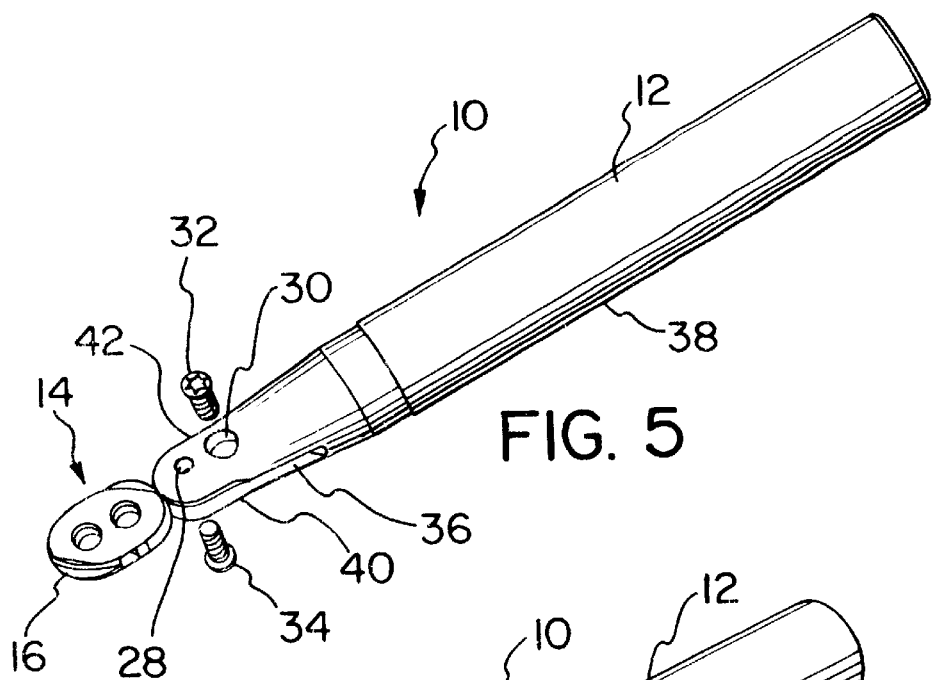
FIG. 5 shows a perspective dis-assembled view of a complete cutting tool assembly
Figure 6:
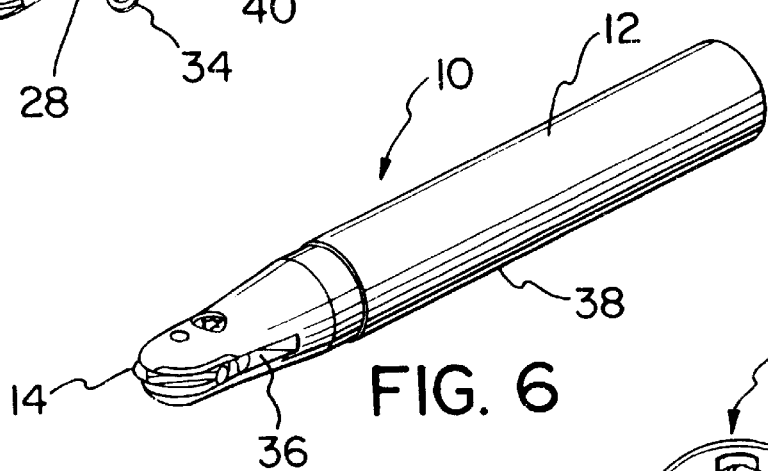
FIG. 6 shows a perspective view of assembled components of FIG. 5.
Figure 7:
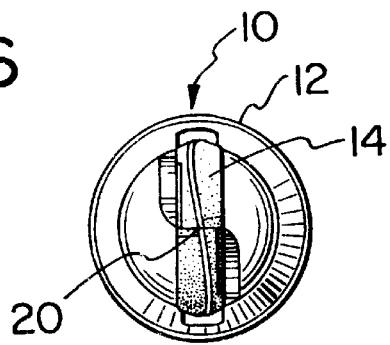
FIG. 7 shows a front view of FIG. 6.
Figure 8:
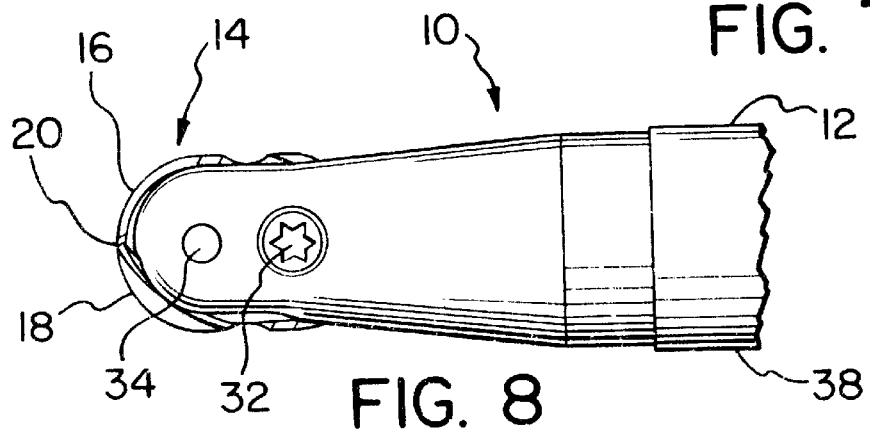
FIG. 8 shows a partial top view of FIG. 6.

Referring now to drawings, FIG. 1–6 show a rotary cutting tool assembly 10 including a holder 12 and an insert 14 fixed immovably in the holder 12. The insert 14 comprises an elongated body provided on both ends with two full ball end cutting faces 16 having a continuous spiral fluted configuration. Each of these cutting faces 16 consists of two radius cutting edges 18 joining at the center with a web 20, thus forming a tip of the respective full ball nose end. In operation, only one cutting face 16 is used at a given time. The cutting edges 18 follow a true helix configuration (see FIG. 3), wherein each cutting face 16 is made of a continuous curve following a spiral configuration without forming any straight faced segment. The helix angles of the cutting edges 18 in the insert 14 with respect to a longitudinal axis are between 3° to 45° on both right and left hand directions. Preferably but not necessarily, the helix angle is chosen between 10 and 15° as shown on FIG. 2. Theoretically, it is possible to make the angle wider than 45°, but in this case other considerations such as thickness of the insert come into play.

The insert 14 is provided with two identical locating set of grooves 22A, 22B and 23A, 23B formed near each ball end cutting face 16. Preferably, the locating set of grooves 22A, 22B, 23A and 23B are oriented under 45° with respect to the longitudinal axis. As it may be seen on FIG. 12, locating set of grooves 22A and 22B are oriented in the opposite direction with respect to a set of location grooves 23A and 23B.

The insert 14 has two openings 26 provided for fixing the insert 14 into the holder 12 by means of a specially designed slot 36 formed at one end of the holding head 12 extending from a main body shaft 38, wherein said holding head 12 forms a unitary unit or element with said main body shaft 38. The slot 36 divides the end of the holding head 12 into two symmetrical halves identified as 40 and 42. The inner surfaces of halves 40 and 42 have two identical seating faces 24 and 25 better shown on FIGS. 10 and 11. Each of these seating faces are made under 45° with respect to the longitudinal axis, but are oriented in opposite directions. Each of the halves 40 and 42 is provided with a set of openings 28 and 30, wherein the opening 28 has a slightly smaller diameter than opening 30. As it may be seen on FIG. 11, on half 40 the larger opening 30 is closer to the tip than the smaller opening 28, wherein on FIG. 10 it is vice versa. The fixing of insert 14 into the slot 36 is provided by means of screws 32 and 34. Opening 30 of the half 42 and opening 28 of the half 40 are slightly off center to allow the insert 14 to be pushed against the corresponding seating faces. To complete the assembly, the insert 14 is positioned into the slot 36, then the screw 34 is inserted through the opening 26 of the insert 14 which is placed to correspond with the opening 28 of the half 42 and opening 30 of the half 40. This allows to preliminarily fix the insert inside of the slot 36. Then, second screw 32 is inserted into the second opening 26 of the insert 14 which corresponds with the opening 30 of the half 42 and opening 28 of the half 40. By tightening the screw 32, the locating groove 22B will firmly abut the corresponding seating face 25 and locating groove 23B will firmly abut the corresponding seating face 24 (see FIGS. 10–12). Similar procedure will take place when the reversible identical ball end will be used. In this case, locating groove 23A will abut corresponding seating face 24 and locating groove 22A will abut the corresponding seating place 25. Such an arrangement of fixing the insert 14 inside of the slot 36 allows to provide a highly stable and immovable seating of the insert inside the holder, which is a substantial advantage of the present invention.

Preferably, the holding head 12 and the main body shaft 38 are made from solid steel and the insert 14 is made from high-speed steel or carbide. The fluted configuration of the insert 14 is made by means of a grinding wheel.

Figure 13:
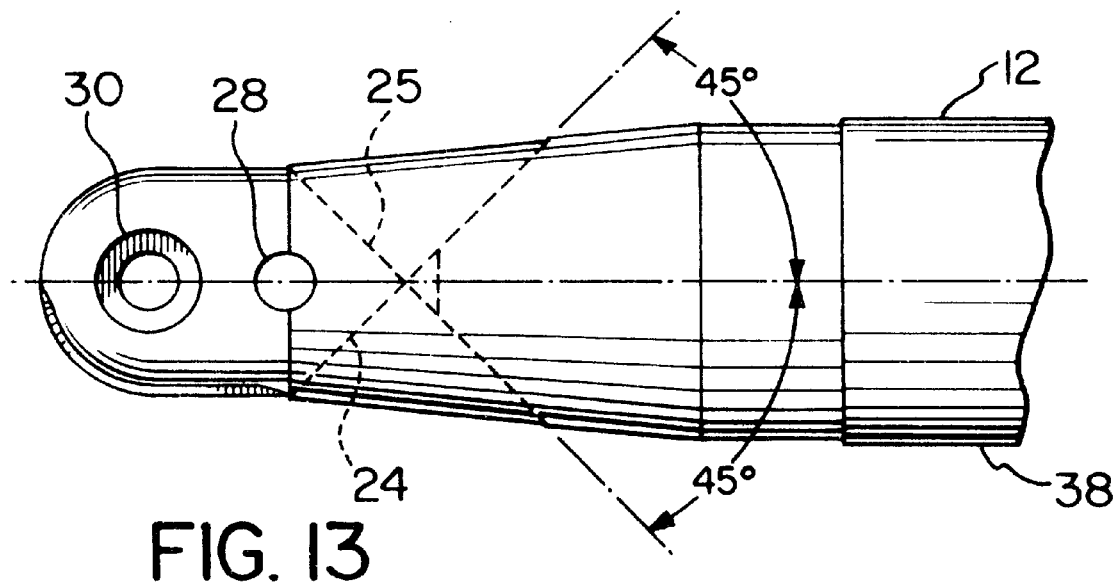
FIG. 13 shows a top view of FIG. 9.
Figure 14:
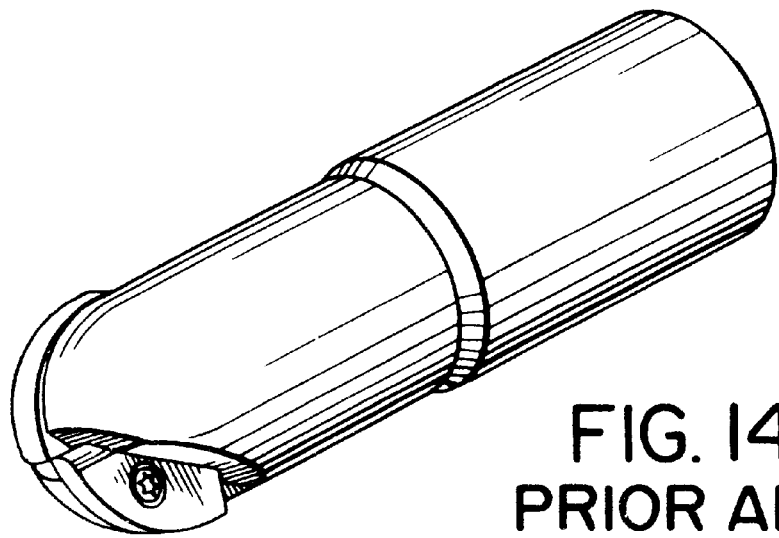
FIG. 14 shows a prior art design.

The present invention has the following advantages if compared to known designs:

- in side miling applications, known tools with "0" helical teeth (see FIG. 13) have a tendency to chatter and break teeth in view of the fact that in a straight flute with "0" helix end mill application the load on each cutting edge builds up almost instantaneously, thus causing deflection, springbacks and chatter. At the same time, when helical fluted edges of the present invention are used, the chip load is evenly distributed along the entire flute length in the progressive sliding action, and hence provides a smoother cutting;
- the configuration of the cutting face consisting of two radius cutting edges meeting at the center or tip allows to achieve a center cutting application wherein the tool can be plunged straight into a metal just like a drill to make a hole. In this case, the web 20 at the center make the cutting face 16 continuous at the tip, and when the tool is plunged into a metal it will be able to cut at the bottom Without this new configuration of the cutting face, it is not possible to plunge-cut, which is a very advantageous feature of the present invention;
- the arrangement of the present invention allows a smoother and more efficient cutting action which was not possible with the known "0" helix inserts. The spiral fluted ball end insert of the present invention enables the tool to cut smoothly resulting in better cutting and higher productivity;
- the presence of the two reversible ball cutting ends in one solid single insert allows cost reduction and substantial decreased machine downtime.

Thus, it can be seen that the objects of the present invention have been satisfied by the structure presented hereinabove. While in accordance with the Patent Statutes, only the best mode and preferred embodiments of the present invention has been presented and described in detail, it is to be understood that the invention is not limited thereto or thereby. Accordingly, for an appreciation of the true scope and breadth of the invention, references should be made to the following claims.

I claim:

1. Rotary cutting tool assembly comprising a combination of:

a unitary ball nose cutting insert of generally elongated configuration, said ball nose cutting insert being removably fixed into a holding head of a main body shaft, said holding head being provided with a slot adapted to securely and non-movably hold said insert, wherein said holding head forms with said main body shaft a one-piece unitary element;

said unitary ball nose cutting insert comprises at least one ball nose cutting end having a cutting edge of continuous spiral fluted configuration;

wherein said ball nose cutting insert has locating grooves formed on both sides of said insert, said locating grooves are provided to directly abut and firmly seat on corresponding seating faces formed on inner walls of said holding head within said slot;

wherein said locating grooves are positioned diagonally with respect to a longitudinal axis of said insert and being oriented in opposite directions with respect to each other; and wherein said corresponding seating faces of said holding head are also positioned diagonally with respect to a longitudinal axis of said holding head and also being oriented in opposite directions with respect to each other.

2. Rotary cutting tool assembly according to claim 1, wherein said final ball nose cutting end comprises a cutting face consisting of two radius cutting edges meeting at a center or tip of said full ball nose cutting end by means of a web.

3. Rotary cutting tool assembly according to claim 2, wherein said cutting face forms a true helical path made of a continuous curve following a spiral shape.

4. Rotary cutting tool assembly according to claim 2, wherein helix angles of said radius cutting edges are between 3 to 45 degrees with respect to a longitudinal axis of said ball nose cutting insert in both right and left directions.

5. Rotary cutting tool assembly according to claim 1, wherein said ball nose cutting insert has a solid configuration.

6. Rotary cutting tool assembly according to claim 1, wherein said single ball nose cutting insert has two identical reversible full ball nose cutting ends formed on opposite ends of said insert.

7. Rotary cutting tool assembly according to claim 6, wherein said radius cutting edges of said cutting faces are arranged to form a spiral or helical configuration.

8. Rotary cutting tool assembly according to claim 6, wherein cutting faces of said single ball nose cutting insert are formed by means of a grinding wheel.

9. A ball nose cutting insert comprising:

an elongated body of unitary configuration, said ball nose cutting insert having at least one ball nose cutting end, wherein said ball nose cutting end has a cutting edge of continuous spiral fluted configuration;

said ball nose cutting insert is provided to be removably fixed into a holding head extending from a main body shaft of a rotary cutting tool said holding head forming a unitary unit with said main body shaft, wherein said holding head is provided with a slot adapted to secured and non-movably hold said insert;

wherein said ball nose cutting insert is provided with locating grooves formed on both sides of said insert, said locating grooves are provided to directly seat on corresponding seating faces formed within the slot of said holding head, said locating grooves being positioned diagonally with respect to a longitudinal axis of said insert and are oriented in opposite directions with respect to each other; and wherein said corresponding seating faces of said slot are also positioned diagonally with respect to a longitudinal axis of said main body shaft and are oriented in opposite directions with respect to each other.

10. A ball nose cutting insert according to claim 9, wherein said full ball nose cutting end comprises a cutting face consisting of two radius cutting edges meeting at a center or tip of said full ball nose cutting end by means of a web.

11. A ball nose cutting insert according to claim 10, wherein said cutting face forms a true helical path made of a continuous curve following a spiral shape.

12. A ball nose cutting insert according to claim 9, wherein helix angles of said radius cutting edges are between 3 to 45 degrees with respect to a longitudinal axis of said ball nose cutting insert in both right and left directions.

13. A ball nose cutting insert according to claim 9, wherein said ball nose cutting insert has a sold configuration.

14. A ball nose cutting insert according to claim 9, wherein said single ball nose cutting insert has two identical reversible fill ball nose cutting ends formed on opposite ends of said insert.

15. A ball nose cutting insert according to claim 14, wherein said radius cutting edges of said cutting faces are arranged to form a spiral or helical configuration.

16. A ball nose cutting insert according to claim 14, wherein cutting faces of said single ball nose cutting insert are formed by means of a grinding wheel.

\* \* \* \* \*